Aug. 9, 1949.  L. J. LOCKWOOD ET AL  2,478,632
SPACER-CONNECTOR FOR FLAT DRY CELLS
Filed April 17, 1947
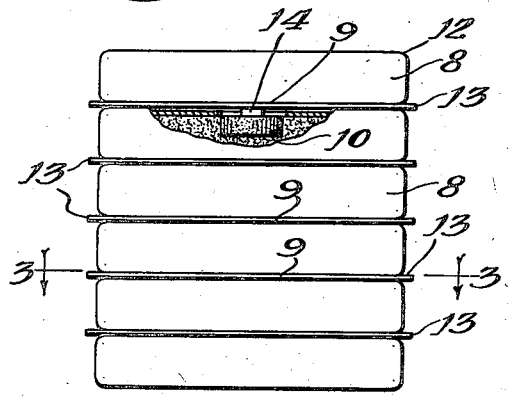
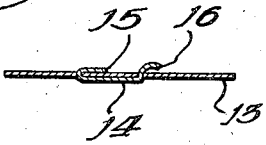
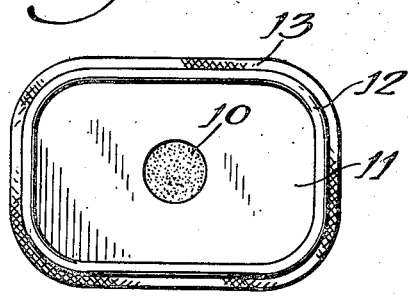
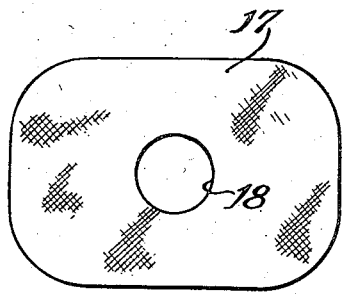
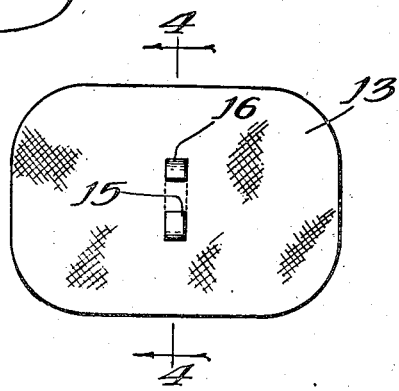
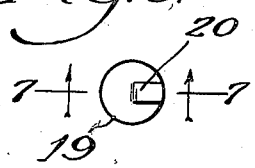
INVENTORS:
Lee J. Lockwood
Vernon F. Gongoll
BY
Attorneys Patented Aug. 9, 1949

2,478,632

UNITED STATES PATENT OFFICE 2,478,632

SPACER-CONNECTOR FOR FLAT DRY CELLS

Lee J. Lockwood, Freeport, Ill., and Vernon F. Gongoll, Madison, Wis., assignors to Ray-O-Vac Company, a corporation of Wisconsin Application April 17, 1947, Serial No. 742,136

5 Claims. (Cl. 136—111)

This invention relates to dry-cells, and more particularly to an improved spacer for insertion between stacked dry-cells, to prevent short circuits between the cells, and to provide a reliable series connection.

The primary object of the present invention is to provide a sheet of thin dielectric material which will serve to prevent electrical connection between the outer walls of stacked dry-cells with a yielding centrally disposed electrical connector to make a series connection between the cells.

The invention is illustrated in a preferred embodiment in the accompanying drawings in which—

Figure 1 is a fragmentary elevational view of a stack of dry-cells employing the improved spacer; Fig. 2 is a top plan view of the stack shown in Fig. 1; Fig. 3 is a plan sectional view, taken as indicated at line 3—3 of Fig. 1; Fig. 4 is a sectional view of one of the spacers, taken as indicated at line 4—4 of Fig. 3; Fig. 5 is a plan view of a modified form of dielectric sheet; Fig. 6 is a plan view of the metal connecting member for use with the sheet shown in Fig. 5; and Fig. 7 is a sectional view, taken as indicated at line 7—7 of Fig. 6.

In the embodiment illustrated, a plurality of dry-cells are shown arranged in superposed relation in Figs. 1 and 2, and connected in series. Each of the dry-cells has a rather shallow zinc can 8, whose bottom wall 9 serves as one terminal for the cell. A small centrally disposed carbon pole 10 serves as the opposite terminal of the cell, and a dielectric cover member 11, having a central aperture for the pole 10, is held in position by the inwardly turned top edge portions of the can 8, as indicated at 12.

It will be understood that if cells of the type described are placed in a stacked relation to form a battery, the inturned margins 12 must be electrically insulated from the metal bottom of the superposed cell to prevent the bottom of the superposed cell acting as an electrical conductor from the inturned margin 12 to the carbon pole 10 of the same cell. To accomplish a desired series connection and prevent the metal bottoms of superposed cells acting as conductors from inturned margins 12 to carbon buttons 10, a sheet of dielectric material 13, which may be in the form of a woven fabric (or a paper) impregnated with a synthetic resin, is provided.

The sheet is large enough to project slightly beyond the outer edges of the cans 8, and it is provided at its central portion with a metal staple 14, which may be formed of copper, brass, or the like. As best shown in Figs. 3 and 4, one leg 15 is clinched against the sheet which it impales, and the other leg 16, although bent in the same direction, is inclined upwardly and forms a resilient contact to engage the bottom of the superposed cell. Thus, it will be understood that when the spacers are inserted between the dry-cells, as shown in Figs. 1 and 2, the cans will be insulated from each other, and the connectors 14 will provide yielding connections between the centrally disposed carbon pole and the bottom of the adjacent superposed dry-cell.

In the embodiment shown in Fig. 6, a dielectric sheet 17 is provided with a central aperture 18. In this form, a separate disc-like metal connector 19 is provided to fit in the aperture 18. A leg 20 is struck upwardly from the disc, and forms a resilient electrical connection between the carbon pole of one cell and the bottom of the zinc can of the adjacent cell.

The foregoing detailed description is given for clearness of understanding only, and no unnecessary limitations should be understood therefrom, for some modifications will be obvious to those skilled in the art.

We claim:

1. A spacer for use in a battery unit which comprises a plurality of superimposed, stacked, dry cells wherein the container for each cell constitutes one of the cell terminals and a substantially centrally-disposed electrode constitutes the other of the cell terminals, said spacer comprising a sheet of thin dielectric material at least co-extensive with and separating the juxtaposed surfaces of said two cells and a metal connector extending through and on both sides of said sheet, said connector having a resilient arm adapted to make a yielding contact with one of said terminals.

2. A spacer for use in a battery unit which comprises a plurality of superimposed, stacked, dry cells wherein the container for each cell constitutes one of the cell terminals and a substantially centrally-disposed electrode constitutes the other of the cell terminals, said spacer comprising a sheet of thin dielectric material at least co-extensive with and separating the juxtaposed surfaces of said two cells and a metal connector provided with a pair of arms each of which impales said sheet and one of which is resilient and adapted to make a yielding contact with one of said terminals.

3. A spacer for use in a battery unit which comprises a plurality of superimposed, stacked, dry cells wherein the container for each cell constitutes one of the cell terminals and a substantially centrally-disposed electrode constitutes the other of the cell terminals, said spacer comprising a sheet of thin dielectric material at least co-extensive with and separating the juxtaposed surfaces of said two cells and a metal connector provided with a pair of arms both of which impale said sheet and one of which is clinched against said sheet for anchorage.

4. A spacer for use in a battery unit which comprises a plurality of superimposed, stacked, dry cells wherein the container for each cell constitutes one of the cell terminals and a substantially centrally-disposed electrode constitutes the other of the cell terminals, said spacer comprising a sheet of thin dielectric material at least co-extensive with and separating the juxtaposed surfaces of said two cells and a metal connector provided with a pair of arms both of which impale said sheet, one of said arms being clinched against said sheet for anchorage, the other of said arms being resilient and adapted to make a yielding contact with one of said terminals.

5. A spacer for use in a battery unit which comprises a plurality of superimposed, stacked, dry cells wherein the container for each cell constitutes one of the cell terminals and a substantially centrally-disposed electrode constitutes the other of the cell terminals said spacer comprising a sheet of thin, substantially self-sustaining, non-conducting, fibrous material at least co-extensive with and separating the juxtaposed surfaces of said two cells and a metal connector extending through both sides of said sheet, said connector having a resilient arm adapted to make a yielding contact with one of said terminals.

LEE J. LOCKWOOD.
VERNON F. GONGOLL.

REFERENCES CITED

The following references are of record in the file of this patent:

UNITED STATES PATENTS

| Number | Name | Date |
|---|---|---|
| 1,609,799 | Douglas | Dec. 7, 1926 |
| 2,307,766 | Deibel | Jan. 12, 1943 |